United States Patent [19]
Gerdes

[11] 3,750,434
[45] Aug. 7, 1973

[54] SCREW CAP WITH LOCK
[75] Inventor: Theo Gerdes, Langenfeld/Rhld., Germany
[73] Assignee: Blau K. G. Fabrik Fuer Kraftfahrzeughteile, Langenfeld/Rhineland, Germany
[22] Filed: May 25, 1971
[21] Appl. No.: 146,668

[30] Foreign Application Priority Data
May 25, 1970 Germany.................... P 20 25 451.7

[52] U.S. Cl.......................... 70/172, 70/221, 215/98
[51] Int. Cl............................................. B65d 55/14
[58] Field of Search............70/166–172, 221–223; 215/9, 98

[56] References Cited
UNITED STATES PATENTS
1,977,493 10/1934 Scott...................................... 70/169
3,213,653 10/1965 Probasco .............................. 70/166
2,880,903 4/1959 Nehls.................................... 70/169

FOREIGN PATENTS OR APPLICATIONS
1,262,388 3/1964 France................................... 70/169
800,103 9/1950 Germany .............................. 70/168

Primary Examiner—Joseph H. McGlynn
Attorney—Michael S. Striker

[57] ABSTRACT

An arrangement of locking bolts for engaging in screw thread or pipe socket parts of cylinder or mortise locks in closure caps and having a removable key, wherein the socket is provided with an inside thread which is partly interrupted, with which a locking bolt engages laterally to secure the cap when the key is turned.

8 Claims, 7 Drawing Figures

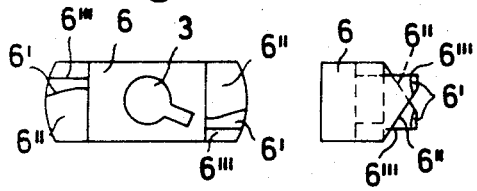
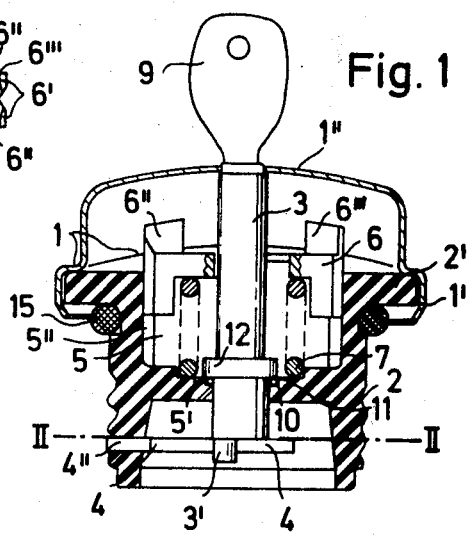
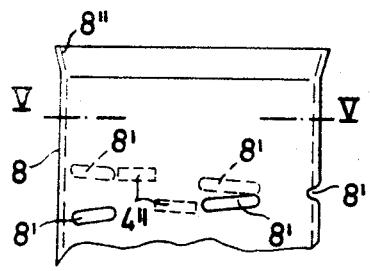
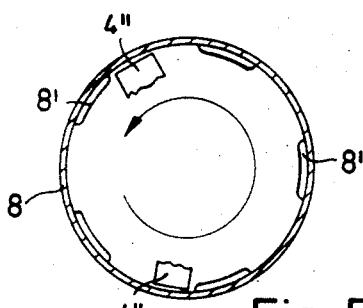
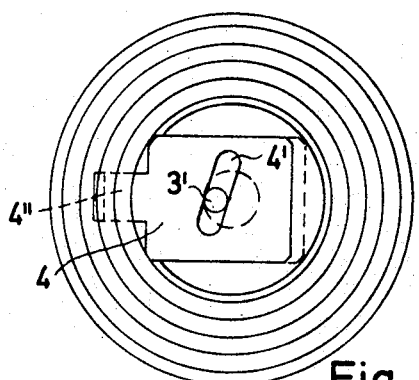

SCREW CAP WITH LOCK

The present invention is concerned with the provision of laterally displaceable locking bolts engaging with the screw thread or pipe socket parts of a cylinder fitted with a locking cap, the bolts being actuated by a removable key or otherwise secured.

Screw thread caps having a locking device acting as safeguard usually include very complicated coupling devices between an outer cap part freely rotatable in the locked state, and an inner true screw cap adapted to be screwed on to a threaded socket. Here shoulders are used on one cap part which are displaceable in corresponding recesses in the other cap parts, either longitudinally, or vertically and outwardly for bayonet fitting closure caps.

It is an object of the present invention to provide an arrangement for the engagement of laterally displaceable catch members of screw caps on threaded socket parts; it is also required that these screw caps may be tightened only to a predetermined degree in the socket thread such that the screw cap is readily slackened for opening, thus preventing any mutual thread jamming between cap and socket.

According to the present invention there is therefore provided an arrangement of locking bolts for engaging in screw thread or pipe socket parts of cylinder or mortise locks in closure caps and having a removable key, wherein the socket is provided with an inside thread which is partly interrupted, with which a locking bolt engages laterally to secure the cap when the key is turned.

Reference is now directed to the accompanying drawings, in which :

FIG. 1 is a section of a locking screw cap with key inserted;

FIG. 2 is a partial section on the line II—II of FIG. 1;

FIG. 3 is a side view of the guide of a lock part showing ratchet-like members engaging in the upper part of the cap;

FIG. 4 is a socket part to be locked, with interrupted thread sections and bolts for internally threaded caps;

FIG. 5 is a cross-section on the line V—V in FIG. 4 with locking bolts indicated;

FIG. 6 is a view of the cap showing the bolt parts offset according to the height of the thread pitch, engaging various places on the socket circumference;and FIG. 7 is a side view of the locking bolt for engagement with the lock cylinder extension.

FIG. 1 shows an upper freely rotatable cap 2' with an external downward extending edge 1' engaging over the lower screw cap part 1 part 2 at its flanged edge 2', with a diagonally superposed pressed out hand grip part 1'', and a lock cylinder 3 inserted therein. The lock cylinder 3 is provided at its lower end with an eccentric pin 3', engaging in a diagonally extending slot 4' formed in a laterally displaceable locking member 4 having an externally extending locking portion part 4'' guided in a slot in a downwardly extending skirt of the lower screw cap part 2, as shown in FIGS. 1 and 2. Within the lower screw cap part 2 and in the cup-shaped recessed space 5 there is a bridge 6 with a compression spring 7 located below it in the cup base 5'. This bridge 6 engages resiliently in the upwardly pressed out space of a hand grip portion 1'' is the upper cap part and is guided on both sides in the wall grooves 5'' which prevent relative rotation, while the lock cylinder 3 is passed through a central bore of the bridge 6. Lugs 6' extend upwardly and resiliently in the hand grip portion 1'' on both sides of the bridge 6, and are engaged with their lateral surfaces 6'' tapering diagonally downwards on both sides by the lower defining edge of the hand grip portion 1'' when the upper cap part 1/1' is twisted in a clockwise direction. Thus the bridge 6 causes the lower screw cap part 2 to be screwed along the interrupted thread sections 8' projecting inwardly within the socket 8, there being five thread parts 8' spread over the circumference of the thread. The screw cap 2 is screwed on the thread section members 8' within the socket 8, while the lug parts 6'' are arranged in the hand grip part 1''', until a reaction equal to a predetermined cover tightening torque is obtained, whereupon a disengagement between hand grip 1'' and the bridge lugs 6'' occurs on both sides, the hand grip 1/1' ratcheting over the bridge lugs, so that the screw cap 2 can be tightened no further on the thread parts 8'.

This ensures that the screw cap cannot be tightened to such an extent as produce mutual jamming of the screw threads of screw cap and socket thread; on the other hand, when opening the screw cap the latter can be rotated readily by hand in an opposite direction of rotation. Now the vertical flank parts 6''' on the opposite side of the bridge 6 are each engaged by the hand grip part 1'' unscrewing the lower screw cap part 2 from the socket thread sections 8', as shown in FIG. 1 or FIG. 3. A predetermined cap tightening torque is accordingly established depending upon the rating of the compression spring 7, so that on reaching a corresponding tightening torque force the cap cannot be tightened further, since automatic disengagement between lower screw cap part 2 or the upper cap part 1 which occurs, is again freely rotatable, thus a ratchet-like sliding of both parts occurs by the interposed bridge 6 with lugs 6' as coupling part, in co-operation with the compression spring 7.

The lock cylinder 3 passed through the centre of the device engages with an eccentric pin 3' which slides in a diagonally located guide slot 4' in a laterally displaceable guided part 4 with an outwardly projecting locking portion 4'', so that by turning the key 9 this sliding locking portion 4'' engages behind an inwardly projecting threaded part 8' within the socket part 8, whereby the closure cap is secured against unauthorised opening.

In FIGS. 4 and 5 an alternative embodiment of the invention is shown. Here two sliding locking members 14'' located on different sides each engage and lock respectively between two inwardly projecting threaded parts 8'. This is expedient especially when the clearance between the threads of the cap and socket is considerable. It is also possible to use diagonally opposite sliding bolts to enable the screw cap to be reliably locked. FIGS. 6 and 7 show different views of two locking members 14'' located vertically offset relative one another is dependence upon the pitch of the cap or socket thread, these members 14'' being laterally movable by means of pins 13 projecting downwardly a plate 13 at the lower end of the lock cylinder 3 into grooves 14' in the locking members 14'', the members 14'' moving outwardly into the locking position for engagement with socket thread parts 8' as shown in FIGS. 4 and 5, or inwardly retractable therefrom enable the closure cap 1/2 to be unscrewed.

To seal the lock cylinder 3 there is a sealing ring 10 enclosing it, which is pressed between a flange part 11 projecting beyond the cylinder circumference and a groove 12 in the base part 5' of the cup-shaped recess 5. Alternately it is possible to use a sealing disc of rubber or like material pressing with a sealing lip against the lock cylinder 3. The numeral 15 denotes a sealing ring inserted in an annular groove below the upper flange edge 2', which is pressed against the socket edge 8" in FIG. 4, which for this purpose is tapered so that the sealing ring 15 is pressed between this sloping wall and the annular groove below the flange edge 2'.

We claim:

1. In an arrangement of the character described, a combination comprising a tube having an open end and being provided in the region of said open end at the inner surface thereof with an interrupted screw thread defining between portions thereof a plurality of gaps; cap means provided on parts of its outer surface thereof with a screw thread for threading engagement with that on the inner surface of said tube, said cap means being provided with a lateral guide slot; a laterally displaceable substantially rigid locking member in said cap means and having a locking portion guided in said guide slot, said member being movable in its entirety relative to said cap means between a locking position in which said locking portion projects beyond the screw thread on said cap means for locking engagement in one of said gaps when said cap means is threadingly engaged in said tube, and an inwardly withdrawn inactive position; and means for moving said locking member between said positions thereof and comprising a lock cylinder rotatably mounted in said cap means, a key engageable with said locking cylinder for rotating the latter, and single means for coupling said lock cylinder with said locking member for positively moving said member between said locking and said inactive position thereof during rotation of said cylinder.

2. A combination as defined in claim 1, and including an additional locking member displaced in circumferential and axial direction of said locking cylinder with respect to said one locking member, said coupling means cooperating with both of said locking members.

3. A combination as defined in claim 1, and including sealing means between said lock cylinder and said cap means.

4. In an arrangement of the character described, a combination comprising a tube having an open end and being provided in the region of said open end at the inner surface thereof with an interrupted screw thread defining between portions of said thread a plurality of gaps; cap means provided on its outer surface thereof with a screw thread for threading engagement with that on the inner surface of said tube, said cap means being provided with a lateral guide slot; a laterally displaceable locking member in said cap means and having a locking portion guided in said guide slot, said member being movable between a locking position in which said locking portion projects beyond the screw thread on said cap means for locking engagement in one of said gaps when said cap means is threadingly engaged in said tube, and an inwardly withdrawn inactive position; and means for moving said locking member between said positions thereof and comprising a lock cylinder rotatably mounted in said cup means, a key engageable with said lock cylinder for rotating the latter, and means coupling said lock cylinder with said locking member for moving said member between said locking and said inactive position thereof during rotation of said cylinder, said coupling means comprising a slot in said locking member extending inclined to the direction of movement thereof and an eccentric pin on said locking cylinder engaged in said inclined slot.

5. In an arrangement of the character described, a combination comprising a tube having an open end and being provided in the region of said open end at the inner surface thereof with an interrupted screw thread defining between portions of said thread a plurality of gaps; cap means comprising an upper part and a lower part provided at the outer surface thereof with a screw thread for threading engagement with that on the inner surface of the tube and with a lateral guide slot, said upper and said lower parts being connected for rotation with respect to each other, and including means in said cap means and cooperating with said parts for connecting said lower part for turning with said upper part when the latter is turned in a direction screwing said cap means into said threaded tube and for releasing said upper part for turning relative to said lower part when a predetermined turning moment during screwing said cap means into said tube is reached; a laterally displaceable locking member in said cap means and having a locking portion guided in said guide slot, said member being movable between a locking position in which said locking portion projects beyond the screw on said cap means for locking engagement in one of said gaps when said cap means is threadingly engaged in said tube, and an inwardly withdrawn inactive position; and means for moving said locking member between said positions thereof and comprising a lock cylinder rotatably mounted in said cap means, a key engageable with said locking cylinder for engaging the latter, and means coupling said lock cylinder with said locking member for positively moving said member between said locking and said inactive position thereof during rotation of said cylinder.

6. A combination as defined in claim 5, including an annular outwardly projecting flange on said lock cylinder, and a sealing ring below said flange and pressed into a groove of said lower cap part.

7. A combination as defined in claim 5, wherein said upper part is formed with an outwardly projecting hollow hand-grip portion having a pair of lower edges, and wherein said means for connecting and releasing said lower parts comprises a bridge member arranged in said lower part movable in axial direction thereof and non-rotatably connected to said lower parts, said bridge member having a pair of lugs having each at one side thereof an inclined cam face for engagement with the respective lower edge of said upwardly projecting hand-grip portion and on the other side a face extending in axial direction of said lock cylinder, and compression spring means for biasing said bridge member in a direction in which said lugs are yieldably held in said hand-grip portion.

8. A combination as defined in claim 7, and including a sealing disc in said lower cap part, said compression spring engaging said sealing disc and pressing the latter with a sealing action against said lock cylinder.

* * * * *